United States Patent Office 3,297,664
Patented Jan. 10, 1967

3,297,664
CALCIUM SALTS OF LIGHTLY CROSS-LINKED ETHYLENICALLY UNSATURATED CARBOXYLIC ACIDS AND DIETHYLENICALLY UNSATURATED ALIPHATICS
John J. Miskel, East Orange, and Walter Schlesinger, Westfield, N.J., assignors to White Laboratories, Inc., Kenilworth, N.J., a corporation of New Jersey
No Drawing. Filed Aug. 6, 1962, Ser. No. 215,242
2 Claims. (Cl. 260—80.3)

This invention relates to insoluble non-toxic metallic salts of loosely cross-linked polymeric swellable resins; to new compositions of matter useful as antidiarrheal agents which contain one or more said salts as an essential active ingredients; and to process for the treatment of diarrhea utilizing such compositions.

Diarrhea may be of the acute or chronic type. Although acute diarrhea may be caused by enteric infections (dysentery et cetera) it is likely that most acute diarrhea is due to abuse of cathartics, ingestion of irritant food, or to minor upsets such as nervous indigestion, acute febrile illnesses or simple fatigue. Because of the difficulty of clinically distinguishing one type from another, the etiology is most frequently unknown and, consequently, symptomatic treatment of the condition is usually undertaken without diagnosis. Chronic diarrhea result from ulcerative colitis, regional inflammation of the bowel, neoplasm, etc. In such cases symptomatic treatment is also usually necessary since the cause is often not known or is difficult or impossible to eliminate.

The most widely used pharmaceutical preparations for the treatment of diarrheal states are based on combinations of kaolin (or other clays intended for the removal by absorption of bacteria, toxins and other irritants), pectin (allegedly a "detoxifier") and, not infrequently, one or more intestinal antibiotics. Although several products based on combinations of the above agents enjoy wide use for the treatment of diarrhea, their use is not accompanied by any great conviction on the part of the physician that the medication is adequate—even for the palliation of symptoms. The following excerpt from the authoritative text (V. A. Drill, "Pharmacology in Medicine," McGraw-Hill, N.Y. 1958) provides an indication of the medical profession's appraisal of available antidiarrheal products:

"A number of substances have been suggested for the control of diarrhea, but the majority of them are relatively ineffective. Charcoal, kaolin, bismuth and chalk which remove gas or toxic substances by absorption have been used extensively but really are no particular value."

That diarrheal states are widely prevalent is well known. Similarly, the discomfort—and indeed danger—often associated with this condition is also common knowledge. The superimposition of these facts on the inadequacy of existing antidiarrheal agents emphasizes the tremendous need for a rapid, safe, easily administered, effective agent for the symptomatic management of this disease.

From the symptomatic point of view, diarrhea is an unpleasant physiological condition characterized by a too rapid evacuation of the contents of the large intestine. This condition is further characterized by the fact that the evacuated contents of the bowels are abnormally fluid and often watery.

It has been discovered that certain swellable resins serve as effective antidiarrheal agents due to their ability to absorb large quantities of fecal fluid within the bowels thereby aiding in the production of firm stools. More particularly, the swellable resins which have been found effective for this purpose are irregular granules of very high molecular weight carboxylic type ion-exchange resins, e.g. acrylic acid type polymers which are very loosely cross-linked with about 0.01–2.0 percent by weight of a poly-unsaturated copolymerizable cross-linking agent and which have only a negligible chain (linear or branched) content.

The major component of these swellable resins consists of one or more monomeric materials, capable of both homopolymerization and copolymerization such as acrylic acid, salts of acrylic acid, methacrylic acid, salts of methacrylic acid, fumaric acid, maleic acid, maleic anhydride, itaconic acid, with acrylic acid being preferred. These monomeric materials will be collectively referred to hereinafter as "acrylic type monomeric material" or "an ethylenically unsaturated carboxylic acid."

The poly-unsaturated copolymerizable cross-linking agents which form the minor component of these swellable resins have two or more double bonds subject to cross-linkage with the monomeric materials previously defined and may be either aromatic or aliphatic.

The aliphatic copolymerizable cross-linking agents which can be used are those which are soluble in the monomer used or those in which the monomer used is soluble. They have the following characteristics: (1) They have a least 5 or 6 carbons in the chain. (2) They have at least two double bonds in the chain, which are at the terminal carbon atoms. These double bonds are separated by at least two carbon atoms. (3) The terminal carbons may have substituted thereon, one or two methyl groups. Thus, the minimum required chain length may be obtained by methyl substituents on the terminal carbons, e.g. 2,5-dimethyl-2,4-hexadiene is included. (4) Any of the carbons in the chain may be methyl substituted. (5) The center portion of the chain, i.e., that portion between the terminal double bonds, may contain one or more moderately polar functional groups, e.g., hydroxyl, esters, ketones, secondary and tertiary amines, double bonds, triple bonds, $SO_2$, et cetera, or the chain may be ether imino, or thioether interrupted. These functional groups are preferably present only in the longer chain aliphatics, where they serve to increase the solubility of the cross-linking agent in the monomer or vice-versa. Solubility of the cross-linking agent in the monomer or of the monomer in the cross-linking agent has been found to be an accurate criterion for predicting whether a particular aliphatic compound will cross-link a particular polymer.

The aliphatic cross-linking agents are especially preferred because by their use the resin may be prepared and fully cured within a few hours, and because the resin obtained is colorless.

The aromatic cross-linking agents which can be used are benzene rings substituted by at least two vinyl or isopropenyl groups. Divinylbenzene is the preferred aromatic cross-linking agent. In general, the usable aromatic cross-linking agents result in resins which take five or more days to cure to maximum swellability, and which are colored.

Suitable cross-linking agents include: N,N-diallylacrylamide, diallylmethyacrylamide, 3,4-dihydroxy-1,5-hexadiene, 2,5-dimethyl-3,4-dihydroxy-1,5-hexadiene, 2,5-dimethyl-1,5- hexadiene, divinylbenzene, diallyl sucrose or other diallyl sugar, divinylether of diethylene glycol, trivinyl benzene, 2,7-dimethyl-1,7-octadiene, 1,7-octadiene, p - diisopropenylbenzene, 1,3,5 - triisopropenylbenzene, 1,1,3,3-tetraalyl-1,3-propanediol, 1,1,3,3-tetramethylallyl-1,3 - propanediol, 4,6-dimethyl-4,6-dihydroxy-1,8-nonadiene, 2,4,6,8 - tetramethyl - 4,6 - dihydroxy-1,8-nonadiene, nonadiene - 1,8,2,8 - dimethylnonadiene-1,8,2,5-dimethyl-1,5-hexadiene-3-yne; with the aliphatics and especially 3,4-dihydroxy-1,5-hexadiene and 2,5-dimethyl-3,4-dihydroxy-1,5-hexadiene and diallyl sucrose being preferred.

The swellable resins useful as antidiarrheals can contain from about 0.01 to about 2 percent of cross-linking agent, with 0.15–0.25 percent constituting a preferred range. The optimum amount of cross-linking agent required will depend to a certain extent on the nature of the cross-linking agent employed.

The unusual utilities of these resins are due, at least in part, to their swelling characteristic. These swelling characteristics are dependent upon the pH of the media in which they are placed, with the amount of swelling increasing as the pH rises. Thus, in the low pH regions of the stomach the preferred resins absorb only about 15–35 cubic centimeters of the gastric juice per gram of resin, and as the resin proceeds through the gastrointestinal tract, the pH of the body fluids rises and swelling increases until in the neutral or basic intestinal juices, the resins absorb about 100 cubic centimeters of intestinal juice per gram of resin. Thus, comparatively little bulk is provided in the stomach, with maximum bulk being provided in the body just prior to elimination.

Where more than about 2 percent of cross-linking agent is employed, the resins do not swell appreciably, and the exchange capacity of the resins is limited due to its dense structure. Where less than about 0.01 percent of cross-linking agent is employed, chain polymers (linear or branched) result rather than the desired cross-linked copolymers.

It can be seen that resins useful as anti-diarrheal agents must contain an accurately defined, closely-controlled amount of cross-linking agent. The method of U.S. 2,810,716, can be used to obtain resins having only the desired amount of cross-linking agent present. While the method of that patent is especially directed to reacting the monomeric material with 0.01–0.2 percent of a polyunsaturated cross-linking agent, it is also suitable for the slightly higher amounts of cross-linking agent needed to make the above-described resins which are useful as anti-diarrheal agents. As shown therein, the copolymerization is carried out by contacting the monomeric materials and the cross-linking agent in the presence of an aqueous solution of a soluble nonredox divalent inorganic ion employed in a concentration above about one-half molar (e.g. saturated magnesium sulfate brine) at temperatures above room temperature and up to reflux. A suitable copolymerization initiator, e.g., benozyl peroxide or azobisisobutryonitrile, is employed in the amount of between 0.01 and 1.0 percent by weight of the reactant monomeric material.

Although the swellable resins as described above have been demonstrated to be effective and highly desirable antidiarrheal agents when administered in tablet form, attempts to formulate pharmaceutically acceptable suspensions of such resins in aqueous and non aqueous media have not been fruitful because of the gelatinous quality of the resin and its tendency to stick to the container, the teeth and mucus membranes.

The instant invention is based, in part, upon applicants' discovery that the above difficulty can be substantially overcome by converting the swellable resin into the corresponding insoluble non-toxic metallic salt. Applicants have found that these salts permit the production of pharmaceutically elegant suspensions, chewing tablets, plain tablets and coated tablets. The insoluble and substantially non-swelling polyvalent salts of this invention have been shown experimentally to lose the metallic ion very rapidly in synthetic gastric juice (equivalent to 0.1 N hydrochloric acid). It is, therefore, apparent that the loosely cross-linked polymeric swellable resin is available for water imbibition and swelling in the alkaline milieu of the intestinal tract.

Further, and surprisingly, applicants' have found that insoluble non-toxic metallic salts of this invention to be more effective imbibing fecal fluid than is the polymeric acid. This unexpected enhancement of water binding action has been confirmed in vivo by controlled comparative studies.

The novel antidiarrheal salts of this invention are readily prepared by adding to a thoroughly stirred aqueous suspension of any of the resins described above a stoichiometric quantity of a non-toxic pharmaceutically acceptable polyvalent metallic cation. Stirring is continued until the acidic resin is fully neutralized, i.e. from 3–10 hours, and the resulting resin salt is then separated by filtration, washed and dried at from 60–80° C. overnight. Preferably, the acidic resin employed above is obtained from a freshly prepared batch and is employed in its swollen state, i.e. after thorough washing but before drying. Where the dried resin is employed, it is allowed to swell in water with constant stirring for approximately one-half hour before salt formation is carried out. The metallic cation may be added in slight excess to insure complete neutralization.

Any polyvalent metallic cation which is non-toxic and pharmaceutically acceptable may be employed in the formation of the salts of this invention. Illustrative of such salts are the calcium, magnesium, aluminum and iron salts. The metallic cations are usually, though not necessarily, introduced into the reaction mixture in the form of salts, e.g. the acetate, carbonate, gluconate, etc.

As pointed out above, the novel salts of this invention, due to their relatively non-gelatinous character, are particularly adapted to the production of pharmaceutically elegant suspensions, chewing tablets, plain tablets and coated tablets. The following formulations will aid in illustrating typical compositions of the present invention but are not to be considered as limiting its scope.

Using the resin salts as described above, the following formulations are prepared as follows:

SUSPENSION

Premix A:
Purified water, gm. _____ 150.0
Veegum HV, R. T. Vanderbilt Co., gm. ____ 3.0

Premix B:
Glycerin 99% CP., qs to 1 liter.
Methylparaben USP., gm. _____ 1.0
Propylparaben USP., gm. _____ 0.2
Kaolin, colloidal, N.F., gm. _____ 10.0
Resin salt (100% thru 200 mesh), (60% thru 325 mesh), gm. _____ 80
Imitation custard flavor, Givaudan Delawana Co., ml. _____ 7.5

Prepare Premix A 24 hours prior to use by slowly adding Veegum to the purified water with continuous agitation at 60° C. Continue stirring at 60° C. for one hour. Discontinue stirring and heating and allow mixture to stand overnight.

Prepare Premix B by dissolving the methylparaben and propylparaben in the glycerin at 60° C. with continuous agitation. Continue agitation until all components are in solution, then cool to 40° C. Add the kaolin and stir until homogeneous. Slowly add the resin salt and continue stirring until the mixture is homogeneous. Cool to room temperature.

Add Premix A to Premix B with continuous agitation. If necessary add purified water to compensate for evaporation loss from Premix A. Continue stirring for 30 minutes. Add the custard flavor and continue stirring for one hour. The resulting suspension delivers 1.2 gm. of resin salt per 15 ml.

CHEWABLE TABLET

Resin salt (100% thru 200 mesh), gm. _____ 310.0
Sugar, confectioner's, gm. _____ 290.0
Mannitol NF, gm. _____ 100.0
Glycine NF, gm. _____ 84.0
Sodium cyclamate NF, gm. _____ 7.2
Saccharin sodium USP, gm. _____ 0.8
Alcohol USP, ml. _____ 50.0
Purified water USP, ml. _____ 50.0
Magnesium stearate USP, gm. _____ 10.0
Orange (dry flavor), Flav-o-lox 3X, Polak Frutal Works, gm. _____ 8.0

Blend resin salt, confectioner's sugar, mannitol, glycine, sodium cyclamate and saccharin sodium for approximately thirty minutes. Add alcohol and water (as a mixture) and mix until the powders are transferred into small granules. Pass through 8 mesh screen and dry at 40° C. Pass dry granulation through 12 mesh screen. Add magnesium stearate and orange flavor and mix for about 20 minutes. Compress to target weight of 810.0 gm. This mixture will yield 1,000 tablets each delivering 310.0 mg. of resin salt.

COATED TABLET

Tablet core:

| | |
|---|---|
| Resin salt, gm. | 600.0 |
| Sugar syrup (13.3 gm. solids), gm. | 20.0 |
| Magnesium stearate, gm. | 2.0 |
| Alcohol USP, ml. | 20.0 |
| Purified water, ml. | 1.8 |

Tablet coating:

| | |
|---|---|
| Gelatin solution, gm. | |
| Flour, gm. | |
| Sugar syrup, gm. | 463.0 gm. |
| Shellac, gm. | |
| FD and C Red No. 2, gm. | |

Prepare tablet core by granulating the resin salt with the sugar syrup. Pass granulation through a 12 mesh screen. Add magnesium stearate and mix well. Add water and alcohol (as a mixture), mix and compress at a weight of 622.0 gm.

Transfer cores to coating pan. Apply several charges of gelatin solution, dust each charge with flour and dry. Apply several charges of sugar syrup and dry each charge. Apply several charges of shellac and dry each charge. Again apply several charges of gelatin solution, dust each with flour and dry. For smoothing, apply several charges of flour paste and dry each charge. Apply colored sugar syrup to a weight of approximately 1085.0 mg., dry and polish. This process yields 1000 tablets each delivering 600.0 gm. of resin salt.

The anti-diarrheal compositions of this invention are administered orally and progress through the digestive tract. The dosage of resin salt is extremely flexible depending primarily upon type, severity and underlying disease. Daily dosages can range from 5 to 10 gm. The usual dosage, however, is from 1 to 4 gm. daily with 2 gm. representing the average dose.

Although the several formulations described above, illustrate dosage forms wherein the resin salt is the sole anti-diarrheal agent, the anti-diarrheal compositions of this invention are by no means limited to such formulations. Also included within the scope of this invention are compositions wherein the anti-diarrheal resin salt is administered in conjunction with one or more additional therapeutic agents designed to combat or alleviate various manifestations of the underlying diarrheal disease.

Particularly advantageous are compositions containing the resin salt in conjunction with an anticholinergic agent having a relatively selective inhibiting effect on intestinal hypermotility. Such compositions, by retarding intestinal hypermotility while simultaneously absorbing excessive fecal fluid, have been found more rapidly to relieve the diarrheal condition than does the administration of either ingredient alone or the administration of both ingredients independently. It is believed that the anticholinergic agent slows down peristalsis sufficiently for the full absorptive capacity of the resin salt to be expended within the intestinal tract. The resin salt therefore, is more efficiently utilized permitting the use of smaller doses. Further, when the anticholinergic agent is administered in combination with the resin salt it is more slowly and evenly released directly in the intestinal tract. This local sustained release avoids undesirable peak effects and minimizes side effects attributed to more massive doses of the anticholinergic agent.

Any anticholinergic agent that acts selectively to inhibit intestinal hypermotility may be combined with one of the previously described swellable resins to form synergistic antidiarrheal compositions. The term "anticholinergic" is applied to any member of a large group of drugs that act to inhibit motor and secretory activity in organs such as the gastrointestinal tract which are supplied with excitatory cholinergic nerve fibers. This group of drugs includes the natural belladonna alkaloids, one of which (atropine) is used generally as a standard of reference for the potency of all anticholinergics, and a large number of synthetic compounds more or less closely related in chemical structure. All are substituted amines, the principal belladonna alkaloids being tertiary amines and most of the synthetic anticholinergics having a quaternary structure. Anticholinergic drugs, in general, have a varying usefulness in the treatment of diarrhea, depending on the selectivity with which they act to inhibit intestinal hypermotility. However, effective antidiarrheal doses of these drugs cause, to a greater or less degree undesirable side effects such as dryness of the mouth and nose, flushing and dryness of the skin, mydriasis, tachycardia and urinary retention. These unwanted effects are a consequence of the actions of the drugs on body structures other than the intestinal tract. A preferred anticholinergic is thihexinol methylbromide. Chemically, this synthetic compound is alpha-di-thienyl-(4 - dimethylamino-cyclohexyl)-carbinol-methylbromide. Pharmacologic studies in animals and humans have shown that orally administered thihexinol methylbromide acts with an unusual degree of specificity to inhibit gastrointestinal motility.

The amount of anticholinergic agent to be employed depends on its nature and known therapeutic dosage. Below is a list of suitable anticholinergic agents together with their daily dose ranges.

| Anticholinergic agents: | Dosage in milligrams |
|---|---|
| Atropine sulfate | 0.8–3.2 |
| Belladonna extract | 30–120 |
| Diphenmethanil methylsulfate | 160–400 |
| Homatropine methylbromide | 4–16 |
| Thihexanol methylbromide | 30–120 |

In addition to anticholinergic agents as described above, other therapeutic agents which display an inhibiting effect on peristalic activity of the bowel (e.g. antispasmotics, antimotility agents, opiates and topical anesthetics) are often prescribed for control of diarrhea. As with the anticholinergics, the antidiarrheal activity of the resin salts herein described can be enhanced by administering the resin salt in conjunction with one or more of such peristalsis inhibiting agents and such compositions are also included within the scope of this invention.

Still further, and highly advantageous formulations included within the scope of this invention, are compositions containing the resin salt in conjunction with one or more antimicrobial and/or antiamebic agents such as antibiotics, sulfa drug and vioform. Such compositions are particularly desirable where the underlying diarrheal state is due in whole or in part to bacterial infestations of the digestive system. The amount of antimicrobial and/or antiamebic agent to be employed will vary with the individual agent according to its known therapeutic dosage. The following is a list of suitable antimicrobial and antiamebic agents together with their daily dose ranges.

| Antimicrobial antiamebic agent | | Daily dose |
|---|---|---|
| Neomycin | gm | 0.075–0.3 |
| Succinylfathiazole | gm | 1.5–6.0 |
| Furazolidone | gm | 0.05–0.2 |
| Dihydrostreptomycin sulfate | gm | 0.15–0.6 |
| Phthalylsulfathiozole | gm | 3.0–12.0 |
| Sulfaguanidine | gm | 2.8–8.0 |
| Polymyphin sulfate | | 240,000–500,000$\mu$ |
| Iodochlorhydroxyquinoline | gm | 0.25–1.0 |

The following formulations will illustrate typical combinations as described above but are not intended as limiting the scope of the instant invention. Using the resin salts of this invention the following formulations are prepared as follows:

RESIN SALT—ANTICHOLINERGIC SUSPENSION

Premix A:
- Purified water _____ gm__ 150.0
- Veegum HV _____ gm__ 3.0

Premix B:
- Glycerin 99% CP, qs to 1 liter.
- Methylparaben USP _____ gm__ 1.0
- Propylparaben USP _____ gm__ 0.2
- Thihexinol methylbromide _____ gm__ 1.0
- Kaolin, colloidal, N.F. _____ gm__ 10.0
- Resin salt (100% thru 200 mesh) (60% thru 325 mesh) _____ gm__ 61.0
- Sodium potassium copper chlorophyllin, color ratio=3.53, 75% active _____ gm__ 0.075
- Methyl salicylate USP _____ ml__ 1.0

Prepare Premix A as previously described. Prepare Premix B by adding the methylparaben and the propylparaben to the glycerin at 60° C. with constant agitation. Slurry the thihexinol methylbromide with approximately 10 ml. of the warm glycerin mixture and add to the batch. Continue agitation until all components are in solution, then cool to 40° C. Add the kaolin and stir until homogenous. Slowly add resin salt and continue stirring until batch is homogenous. Cool to room temperature.

Add Premix A to Premix B. If necessary add water to compensate for evaporation loss from Premix A. Stir for thirty minutes. Slurry the sodium potassium copper chlorophyllin with approximately 10 ml. of the suspension and return to batch. Add methyl salicylate and continue stirring for one hour. The resulting suspension delivers 5 mg. thihexinol methylbromide and 305 mg. of resin salt per 5 ml.

RESIN SALT—ANTIBIOTIC SUSPENSION

Premix A:
- Purified water _____ gm__ 75.0
- Veegum Hv _____ gm__ 3.0

Premix B:
- Purified water _____ gm__ 75.0
- Neomycin sulfate USP, granular non-sterile _____ gm__ 31.5

Premix C:
- Glycerin 99% CP qs to 1 liter.
- Methylparaben USP _____ gm__ 1.0
- Propylparaben USP _____ gm__ 0.2
- Kaolin, colloidal N.F. _____ gm__ 10.0
- Resin salt (100/ thru 200 mesh) (60% thru 325 mesh) _____ gm__ 80.0
- FD and C Red No. 2 _____ gm__ 0.015
- Redistilled peppermint oil _____ ml__ 0.5

Prepare Premix A as previously described. Prepare Premix B by dissolving the neomycin sulfate in the purified water with agitation just prior to preparation to Premix C.

Prepare Premix C by adding the methylparaben and the polyparaben to the glycerin at 60° C. with constant agitation. Continue stirring until all components are in solution, then cool to 40° C. Add the kaolin and stir until homogenous. Slowly add the resin salt, stir until homogenous and cool to room temperature.

Add Premix A to Premix C. If neccessary add water to compensate for evaporation loss from Premix A. Stir until homogenous. Add Premix B and continue stirring for thirty minutes. Slurry the color with approximately 10 ml. of the suspension and return to the batch. Add peppermint oil and stir until homogenous. The resulting suspension yields 1.2 gm. of resin salt and 300 mg. neomycin per 15 ml.

RESIN SALT—ANTICHOLINERGIC—ANTIBIOTIC SUSPENSION

Premix A:
- Purified water _____ gm__ 150.0
- Veegum _____ gm__ 10.0

Premix B:
- Purified water _____ gm__ 150.0
- Neomycin sulfate, granular, non-sterile _____ gm__ 31.5

Premix C:
- Glycerin 99% CP, qs to 1 liter.
- Methylparaben USP _____ gm__ 1.0
- Proplyparaben USP _____ gm__ 0.2
- Thihexinol methylbromide _____ gm__ 1.0
- Kaolin, colloidal, N.F. _____ gm__ 10.0
- Resin salt (100% thru 200 mesh) (60% thru 325 mesh) _____ gm__ 60.0
- Black cherry flavor, Seeley and Co. ___ ml__ 1.25
- FD and C red No. 2 _____ gm__ 0.015

Prepare Premix A, Premix B and Premix C and blend to form finished suspension as previously described. The resulting suspension delivers 150 mg. of neomycin, 5 mg. of thihexinol methylbromide and 300 mg. of resin salt per 5 ml.

RESIN SALT—ANTIBIOTIC CHEWABLE TABLET

- Resin salt (100% thru 200 mesh) ____ gm__ 310.0
- Neomycin sulfate USP _____ gm__ 112.5
- Sugar, confectioner's _____ gm__ 297.5
- Mannitol NF _____ gm__ 170.0
- Aminoacetic acid NF _____ gm__ 84.0
- Sodium cyclamate NF _____ gm__ 10.0
- Saccharin sodium USP _____ gm__ 1.0
- Imitation blackcurrant (dry flavor) Flav-o-lox 3X Polak frutal works ____ gm__ 10.0
- Magnesium stearate USP _____ gm__ 5.0
- Alcohol USP _____ ml__ 40.0
- Purified water USP _____ ml__ 40.0

Mix the resin salt, neomycin sulfate, confectioner's sugar, mannitol, aminoacetic acid, sodium cyclamate and saccharin sodium and blend for thirty minutes. Add the alcohol and water (as a mixture) and mix until powders are transformed into small granules. Pass through a 4 mesh screen and dry at 40° C. overnight. Pass the dry granulation through a 16 mesh screen. Add the magnesium stearate and black currant flavor and mix for twenty minutes. Compress to a target weight of 1 gm. This batch yields 1,000 tablets each of which delivers 310 mg. resin salt and 75 mg. neomycin.

Having now described the instant invention in general terms, and the method of making and using same, the best mode contemplated by the inventors of carrying out their invention will now be set forth as follows:

EXAMPLES

*Examples 1*

A mixture of 60 parts acrylic acid, 0.63 part of divinyl benzene and 0.60 part of benzoyl peroxide was added while stirring to 950 volume parts of a saturated magnesium sulfate brine maintained at steam temperatures. Polymerization occurred within about one hour. The resultant polymer was then heated at about 95 degrees centigrade for an additional four days for curing purposes. The resultant cured resin was carefully washed with hot water and then dried. There was thus obtained about 80 percent of the theoretical amount of loosely cross-linked amber-brown swellable resin containing about 1 percent cross-linking agent.

Following the procedure of Example 1, many other loosely cross-linked resins were prepared, as shown in the following chart. For convenience, in the following chart, the acrylic type monomeric material used is designated by a capital letter, the cross-linking agent is designated by a number, and the polymerization initiator by a small letter, according to the following key:

MONOMER
(A) acrylic acid
(C) methacrylic acid
(G) maleic anhydride
(H) sodium acrylate
(K) monoethyl fumarate CROSS-LINKING AGENT
(3) 2,5-dimethyl-3,4-dihydroxy-1,5-hexadiene
(5) divinylbenzene
(10) p-diisopropenylbenzene
(12) 1,1,3,3-tetraallyl-1,3-propanediol
(13) 1,1,3,3-tetramethylallyl-1,3-propanediol
(14) 4,6-dimethyl-4,6-dihydroxy-1,8-nonadiene
(15) 2,3,6,8-tetramethyl-4,6-dihydroxy-1,8-nonadiene
(19) 3,4-dihydroxy-1,5-hexadiene
(20) 2,5-dimethyl-1,5-hexadiene POLYMERIZATION INITIATOR
(a) azobisisobutyronitrile
(b) benzoyl peroxide

*Example 26*

Using a procedure similar to that of the previous example, 130 pounds of glacial acrylic acid was cross-linked with 105 cubic centimeters of divinyl glycol in the presence of 16 gallons of water containing 1,100 pounds of USP magnesium sulfate using 175 grams of azobisisobutyronitrile as the catalyst. After three hot washings and two cold washings with 400 gallon portions of water, the resin was dried. About a 90 percent yield of product was obtained.

*Example 27*

A mixture of 1000 grams of acrylic acid, 8.0 cubic centimeters of 3,4-dihydroxy-1,5-hexadiene and 3.0 grams of azobisisobutyronitrile was added while stirring to a hot brine (about 90 degrees centigrade) consisting of 16,360 grams of $MgSO_4 \cdot 7H_2O$ and 6400 cubic centimeters of water. Copolymerization was complete within 2 hours, and the brine was then separated from the cross-linked resin by filtration. The resin was then washed several times with hot water (until the optimal swelling is obtained). Then 4 grams of a food-grade

| Example Number | Monomer and grams thereof | Cross-linking agent and grams thereof | Initiator and grams thereof | Polymerization Conditions | | Curing time | Yield in grams |
|---|---|---|---|---|---|---|---|
| | | | | Time (minutes) | Temperature (degrees C.) | | |
| 2 | (A), 100 | (5), 1.2 | (b), 1.0 | 16 | 95 | 5 days | 80 |
| 3 | (A), 100 | (5), 0.92 | (a), 0.4 | 13 | 95 | 3 days | 78.2 |
| 4 | (C), 100 | (5), 0.92 | (b), 1.0 | 13 | 95 | 5 days | 64.5 |
| 5 | (A), 100 | (3), 0.59 | (a), 0.3 | 20 | 95 | 2 hours | 90 |
| 6 | (G), 100 | (5), 2.2 | (b), 1.0 | 60 | 65 | 5 days | 80 |
| 7 | (H), 100 | (5), 0.92 | (a), 0.3 | 120 | 95 | 2 days | 83 |
| 8 | (A), 50, and (K), 50. | (5), 0.92 | (a), 0.3 | 40 | 94 | 2 days | 89 |
| 9 | (A), 100 | (19), 0.8 | (a), 0.3 | 20 | 95 | 2 hours | 81 |
| 10 | (A), 100 | (14), 1.0 | (a), 0.3 | 15 | 84 | 2 hours | 88 |
| 11 | (A), 100 | (15), 1.15 | (a), 0.3 | 5 | 92 | 2 hours | 75 |
| 12 | (A), 100 | (12), 0.60 | (a), 0.3 | 5 | 87 | 2 hours | 82.5 |
| 13 | (A), 100 | (13), 0.76 | (a), 0.3 | 17 | 92 | 2 hours | 50 |
| 14 | (A), 100 | (10), 0.50 | (a), 0.3 | 5 | 92 | 5 hours | 72 |
| 15 | (C), 100, and (K), 9. | (5), 0.92 | (a), 0.3 | 16 | 93.5 | 2 days | 90 |
| 16 | (H), 100 | (19), 0.92 | (b), 1.0 | 41 | 93.5 | 3 hours | 85 |
| 17 | (A), 100 | (5), 0.92 | (b), 2.0 | 35 | 94 | 27 min | 81 |
| 18 | (A), 100 | (15), 1.53 | (a), 0.3 | 4 | 92 | 5 hours | 77 |
| 19 | (A), 100 | (13), 1.52 | (a), 0.3 | 3 | 92 | 97 min | 48 |
| 20 | (C), 100 | (3), 1.0 | (a), 0.3 | 40 | 94 | 35 min | 89 |
| 21 | (C), 100 | (15), 1.0 | (a), 0.3 | 30 | 85 | 105 min | 39 |
| 22 | (G), 50 | (5), 0.5 | (a), 0.15 | 17 | 85 | 23 hours | 47 |
| 23 | (A), 100 | (20), 0.8 | (a), 0.3 | 25 | 95 | 1 hour | 66 |
| 24 | (A), 59 | (19), 0.006 | (a), 0.175 | 11 | 93 | 79 min | 41 |

*Example 25*

To one gallon of soft tap water at 90–95 degrees centigrade in a glass-lined container equipped with stirrer, condenser and temperature controls, is added, with rapid stirring, 76 pounds of USP magnesium sulfate. After 5–10 minutes stirring, it is cooled to 78–82 degrees centigrade. A premixture at 15–25 degrees centigrade containing 8.7 pounds of glacial acrylic acid, 0.13 pound of polyallyl sucrose monomer (sucrose containing between 2 and 8 allyl groups per molecule but preferably 3 allyl groups), and 11.7 grams of azobisisobutyronitrile is then added. Polymerization begins immediately and reaches a maximum after about 5 minutes. Stirring of the system is then maintained for a total of 90 minutes at a temperature of 90 degrees centigrade.

The hot brine-polymer mixture is diluted with 2 gallons of 25–30 degrees centigrade tap water, poured onto a fine stainless-steel screen, allowed to drain, spray washed or sparged with stirring with an additional 15 gallons of 30 degree centigrade tap water. The product is washed on the screen with five separate 15 gallon portions of tap water, all of which except the second is at 25–30 degrees centigrade; the second is with hot water at 70–80 degrees centigrade. After the last washing, the cross-linked product is drained completely and dried in hot, 90–95 degrees centigrade, flowing air for 72 hours.

A yield of 8.1 pounds or over 93 percent of theoretical based on the starting weight of acrylic acid is obtained of a dry, white granular, free flowing product.

non-toxic polymer lubricant, glyceryl distearate, was mixed into the swollen resin and the resin was then dried. There was thus obtained 800 grams of hydrophilic resin, which swelled in artificial intestinal juice by absorbing close to 120 cubic centimeters per gram of resin.

*Example 28*

To a swollen suspension of 50 gm. of the resin as prepared in Example 1 (i.e. washed but not dried) all a stoichiometric quantity of calcium carbonate. Stir the mixture for 3–5 hours to allow the reaction to go to completion. Filter the calcium salt thus formed and wash with distilled water to a pH of approximately 6.0. Dry the salt in an oven at approximately 60° C.

Employ the above process to prepare the corresponding calcium salts of any of the resins of Examples 2–27.

*Example 29*

To a swollen suspension of 50 gm. of the resin as prepared in Example 1 in distilled water, add a stoichiometric quantity of aluminum acetate. Allow the mixture to stir for 6–8 hours to permit complete reaction. Separate the aluminum salt thus formed by filtration and wash with distilled water to approximately pH 6.0. Dry the product in an oven at 60° C.–80° C. overnight.

Employ the above process to prepare the corresponding aluminum salts of any of the resins of Examples 2–27.

*Example 30*

To a swollen suspension of 50 gm. of the resin as prepared in Example 1 in distilled water, add a stoichiometric quantity of MgO. Stir the mixture overnight to ensure complete reaction. Filter the magnesium salt thus formed and wash with distilled water. Dry the product in an oven at 60° C.–80° C. overnight.

Employ the above process to prepare the corresponding magnesium salt of any of the resins of Example 2–27.

*Example 31*

To a swollen suspension of 50 gm. of the resin as prepared in Example 1 is distilled water, add a stoichiometric quantity of ferrous gluconate in 200 ml. of warm distilled water containing 0.1% sodium metabisulfite. Stir the mixture for 2–3 hours. Separate the ferrous salt thus formed by filtration and wash first with distilled water and then with acetone. Dry the product under vacuum at 60° C.–70° C.

Employ the above process to prepare the corresponding ferrous salt of any of the resins of Examples 2–27.

Although the instant invention has been particularly illustrated with reference to the calcium, aluminum, magnesium and ferrous salts of the specific resins described in above Examples, any polyvalent metallic cation which is non-toxic and pharmaceutically acceptable may be employed in the formation of the salts of this invention, and applicants consider all such salts to be the full equivalents of the salts specifically illustrated. In addition, the instant invention is not to be limited by the specific resins shown and described above as many obvious equivalents will be apparent to those skilled in the art.

We claim:

1. A cross-linked swellable resin, said resin consisting essentially of a polymer of an ethylenically unsaturated carboyxlic acid cross-linked with about 0.01 to 2.0 percent by weight of a cross-linking agent, wherein the monomer of the said carboxylic acid is of the type capable of both homopolymerization and copolymerization, and wherein the cross-linking agent is a di-terminally ethylenically unsaturated aliphatic compound having more than five carbons in the chain, and wherein the cross-linking agent is soluble in the monomer of the said carboxylic acid reacted with a stoichiometric quantity of calcium ion.

2. A cross-linked swellable resin of claim 1, said resin consisting essentially of a polymer of acrylic acid cross-linked with about 0.01 to 2.0 percent by weight of 3,4-dihydroxy-1,5-hexadiene reacted with a stoichiometric quantity of calcium ion.

References Cited by the Examiner

UNITED STATES PATENTS

| 2,340,110 | 1/1944  | D'Alelio | 260—2.2  |
| 2,340,111 | 1/1944  | D'Alelio | 260—2.2  |
| 2,798,053 | 6/1957  | Brown    | 260—2.2  |
| 2,810,716 | 10/1957 | Markus   | 260—88.1 |
| 3,202,577 | 8/1965  | Markus   | 167—72   |

OTHER REFERENCES

Helfferich: Ion Exchange, pages 35, 36 (1962), McGraw Hill, New York, Library Call No. QD561H4 (1962).

Kunin: Elements of Ion Exchange, Reinhold Pub. Corp., N.Y., (1960), pages 35, 123, QD561K8.

WILLIAM H. SHORT, *Primary Examiner.*

SAMUEL H. BLECH, *Examiner.*

J. C. MARTIN, C. A. WENDEL, *Assistant Examiners.*